United States Patent [19]

Stürwald et al.

[11] Patent Number: 4,891,566
[45] Date of Patent: Jan. 2, 1990

[54] METHOD FOR SPEED REGULATION AND SWITCH ARRANGEMENT FOR PERFORMING THE METHOD

[75] Inventors: Wilhelm Stürwald, Stuttgart; Stefan Wieczorek, Fellbach, both of Fed. Rep. of Germany

[73] Assignee: SKF Textilmaschinen-Komponenten GmbH, Fed. Rep. of Germany

[21] Appl. No.: 228,609

[22] Filed: Aug. 5, 1988

[30] Foreign Application Priority Data

Aug. 7, 1987 [DE] Fed. Rep. of Germany ....... 3726295

[51] Int. Cl.$^4$ .............................................. H02P 5/50
[52] U.S. Cl. ...................................... 318/78; 318/69; 318/85; 57/100
[58] Field of Search .............. 318/78, 85, 68, 69, 318/70, 71, 41, 44, 49; 57/100, 93–95; 242/35.5 R

[56] References Cited

U.S. PATENT DOCUMENTS

| | | | |
|---|---|---|---|
| 3,803,469 | 4/1974 | Kuroyanagi | 318/85 |
| 4,310,787 | 1/1982 | Seeger et al. | 318/78 |
| 4,327,313 | 4/1982 | Tsuboi et al. | 318/52 |
| 4,418,301 | 11/1983 | Griffith | 318/59 |
| 4,447,788 | 5/1984 | Mundt et al. | 318/78 |

Primary Examiner—David Smith, Jr.
Attorney, Agent, or Firm—Wigman & Cohen

[57] ABSTRACT

To regulate the speed of a plurality of asynchronous motors fed by a converter having a variable output frequency and output voltage and having a load-dependent slip, particularly asynchronous motors for driving spindles of a textile machine, the rotational frequency of several selected asynchronous motors is measured by means of respective digital frequency indicators. This measurement takes place in continuous repetition, always beginning simultaneously. The pulses of the frequency indicators are counted by means of respective first counters (1–6), all of which release a pulse when they reach the same counter condition. An OR circuit (13–17) connects the counter outputs with a second pulse counter (18) in such a manner that this condition is reached first by the output pulse released by the highest rotational frequency and then by the output pulses released by the second-highest rotational frequency, etc. When the second pulse counter (18) has counted a predetermined number of pulses, the last of which being released by the frequency representing the average speed value, the second pulse counter (18) produces an output pulse which results in all counters (1–6, 18) being reset. The one of the AND gates (25–30) to which the rotational frequency representing the average frequency value is applied is triggered to transmit the frequency signal to the converter.

11 Claims, 1 Drawing Sheet

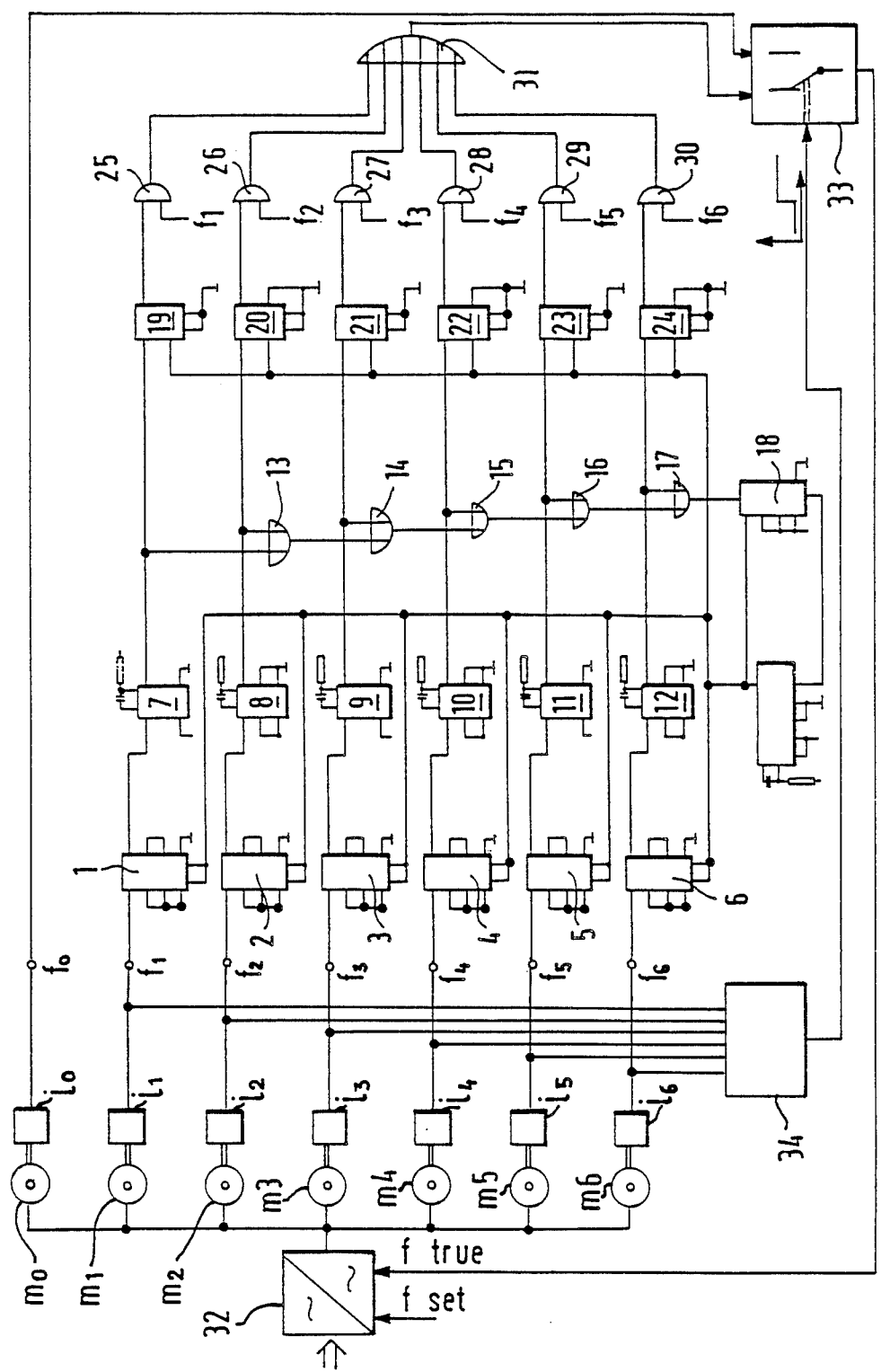

4,891,566

METHOD FOR SPEED REGULATION AND SWITCH ARRANGEMENT FOR PERFORMING THE METHOD

BACKGROUND OF THE INVENTION

The invention relates to a method for regulating the speed of asynchronous motors by means of a converter having a variable output frequency and output voltage, which motors have a load-dependent slip, particularly to regulate the speed of spindles of a textile machine driven by respective asynchronous motors. In addition, the invention relates to a switch arrangement to perform this method.

SUMMARY OF THE INVENTION

In known methods of the above-described type, the speed differences in the asynchronous motors caused by the load-dependent slip cannot be avoided. Because this type of speed differences, for example in spindles of textile machines, can be significant and therefore cause problems, the object of the invention is to create a method of the type under discussion, which, with simple means, makes it possible to reduce the differences in speed to such an extent that they are no longer problematical.

This object is achieved by a method having the characteristics of claim 1. This method is based on the realization that the instantaneous average value of the different rotational frequencies are available in sufficiently short time periods as control signals to control the converter if, in correspondingly short time periods, the rotational frequencies of a representative portion of the asynchronous motors is determined and that value is selected as the control signal for the converter that leads to the smallest speed deviations. As a rule, this will be the average value of the identified rotational frequencies. In order not to have to calculate the frequency value selected as the control signal for the converter, the individual measurement values are collected in order of magnitude. Because the frequency identification takes place simultaneously in all motors, the first value is that of the highest rotational frequency, the second value is that of the second-highest rotational frequency, etc. As soon as this series of measurement values extends to include the nth value, e.g., the fourth measurement value, this measurement value is supplied to the converter control. It is therefore unnecessary to wait until the rotational frequencies of all motors belonging to the selected group have been determined. In this manner the time required before the beginning of the next measurement cycle can be materially reduced, which represents a significant advantage.

The number of motors that must be included in the selected group depends on the precision with which the highest rotational frequency must be determined and how large the steps may be between the highest and lowest rotational frequency in order to be able to determine the representative frequency value with sufficient precision.

To the extent it is necessary to consider that at least one of the motors in the selected group is periodically at rest, as is the case in textile machines, the method can be performed continuously until the selected group is capable of delivering the requisite number of measurement values. However, in this manner the quality of the identification of the representative frequency values with a decreasing number of operating motors is reduced. If more measurement values are required than the number of operating motors until the measurement can be broken off, then the method can be modified so that during one measurement cycle, measurement values of the operating motors are identified several times, until the requisite number of measurement values is reached. Because it cannot be prevented that all motors of the selected group are still at the same time, in one preferred embodiment it is provided that the rotational frequency of an additional motor is supplied to the converter control.

Another object of the invention is to create a switching arrangement to perform this method. This object is achieved by a switching arrangement having the characteristics of claim 6. The advantage of this switching arrangement exists not only in the fact that the requisite expense is low, but also in the fact that very short measurement cycles can be achieved, so that the newest representative frequency values can be transmitted onward to the converter control in extremely short time frames. Advantageous embodiments of this switching arrangement are the objects of dependent claim 7 and 8.

The invention is described in greater detail below with the aid of an exemplary embodiment, the circuit of which is illustrated in the single drawing.

DETAILED DESCRIPTION OF THE DRAWING

In a spinning machine (not shown) having 500 spindles, each of which is driven by means of an asynchronous motor, the energy supply of these asynchronous motors is provided by a converter that has a variable output frequency and a variable output voltage. The output frequency and output voltage are adjusted by a converter control. To assure that the load-dependent slip of the asynchronous motors can be held constant at a constant speed by means of a voltage regulator, it is necessary to continuously supply the converter control with a speed value as a set point value. To assure that the deviations in the motors from the set point speed is as small as possible, this speed value must correspond to the average value between the highest and lowest rotational frequencies.

Of the 500 spindles in the exemplary embodiment, six spindles are selected as so-called lead spindles. It can be assumed that at least one of these lead spindles has an approximate rotational frequency that is approximately equal to the momentary highest rotational frequency of one of the spindles. In addition, a division of the range between the highest and the lowest rotational frequencies into six to eight steps is normally sufficient in order to obtain the average value of the rotational frequency with sufficient precision. A digital frequency indicator is associated with each of the six lead spindles or their motors. This would involve pulse indicators having a number of pulses that is proportional to the number of rotations per unit of time. The rotational frequencies of these eight lead spindles are designated with $f_1$ to $f_6$.

As shown in the drawing, each of these digital frequency indicators is connected with the input of a pulse counter. These pulse counters are designated with the numerals 1 through 6. They are all formed identically, and, in the exemplary embodiment, are capable of counting a maximum of 256 pulses. The 256th pulse releases an output pulse. Because all of the pulse counters 1 through 6 begin to count simultaneously, the first pulse counter to release an output pulse is the one associated with the lead spindle moving with the highest rotational frequency. The pulse counter associated with the lead spindle operating with the second-highest rotational frequency releases the next output pulse. Then follows the output pulse of the pulse counter associated with the third-highest rotational frequency, etc.

In order to avoid the output pulses overlapping in time, an IC is engaged behind each pulse counter 1 through 6, which, because of the rising edge of the output pulse of the pulse counter, produces an extremely short output pulse. These ICs are all formed identically and are characterized with the reference numerals 7 through 12.

As shown in the drawing, the outputs of the ICs are connected to an OR circuit consisting of five OR gates 13 through 17. The outputs of the two ICs 7 and 8 thereby are connected to the two inputs of the OR gate 13 and its output is connected to one input or the OR gate 14. The other input is connected with the output of IC 9. The output of the OR gate 14 is connected with one input of the OR gate 15, the other input of which is connected with the output of the IC 10. The connections between the ICs 11 and 12 and the OR gates 15 through 17 are made in the same way. The output of the OR gate 17 is connected with the input of a pulse counter 18.

The pulse counter 18 is capable of counting three input pulses, and with eight lead spindles, four input pulses. At the third pulse, in the exemplary embodiment, a pulse is released at its output which also serves as a reset pulse for it and for the pulse counters 1 through 6. Therefore, this output is connected with the reset input of the pulse counter 1 through 6. On the basis of the logical coupling of the output signals of the ICs 7 through 12 by means of the logic formed by the OR gates 13 through 17, the output pulses of the ICs 7 through 12 in succession reach the pulse counter 18 in the order associated with the three highest rotational frequencies. The pulse counter 18 therefore then produces an output pulse when the third-highest value of the rotational frequencies of the lead spindles is presented. Because the output pulse of the pulse counter 18 resets it and the pulse counters 1 through 6, a new counting cycle is begun by this output pulse, in which again all pulse counters 1 through 6 simultaneously begin to count.

The output of the pulse counter 18 is connected with one input of respective time members 19 through 24. A second input of the time member 19 is connected with the output of IC 7. The second inputs of the time members 20 through 24 are connected in the same manner to the outputs of IC 8 through 12. When an output pulse of the pulse counter 18 appears, the time member connected to the particular IC that produced the pulse to release the output pulse of the pulse counter 18 itself produces an output pulse.

The output of each of the time members 19 through 24 is connected with one input of an AND gate. These AND gates are distinguished with reference numerals 25 through 30. The second input of each AND gate 25 through 30 is connected with the output of the pulse indicator associated with the preceding pulse counter. The second input is therefore designated with $f_1$, $f_2$, $f_3$, $f_4$, $f_5$ and $f_6$, respectively. The AND gates 25 through 30 assure that the rotational frequencies $f_1$ through $f_6$ are transferred onward to that which produced the pulse that effected the output pulse of the pulse counter 18.

The outputs of the AND gates 25 through 30 are connected with respective inputs of a NOR gate 31, because in the exemplary embodiment the inverse frequency signal is required for the control of the converter control. The output of the NOR gate 28 delivers the through-transmitted frequency value to the later (not shown) converter control until another frequency value is identified as the control value in a subsequent measurement.

All characteristics mentioned in the above specification as well as those that can be taken only from the drawing are components of the invention as further embodiments, even if they are not particularly emphasized and not mentioned in the claims.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method for speed regulation of spindles of a textile machine, which spindles are individually driven by independent asynchronous motors fed by means of a converter having a variable output frequency and output voltage and having a load-dependent slip comprising the steps of:
   (a) counting pulses produced by an indicating means connected to each of said motors, said counting is performed by a counting means, with continuous repetition and with continually simultaneous beginnings for said counting toward an end value that is the same for each counting means,
   (b) conducting a counting cycle which depends on the rotational frequency of a group of asynchronous motors selected from the total number of asynchronous motors present, and
   (c) transmitting the rotational frequency of a selected asynchronous motor from said group to the converter as a control value when an nth end value is attached, whereby n is a preset value that is smaller than the number of asynchronous motors forming the selected group.

2. A method according to claim 1, wherein the value n is at least approximately equal to half the number of asynchronous motors forming the selected group.

3. A method according to claim 1, wherein the measurement of the rotational frequency of the rotating asynchronous motors is repeated until the nth end value is attained for a number of rotating asynchronous motors of the selected group that is smaller than the preset value n.

4. A method according to claim 2, wherein the measurement of the rotational frequency of the rotating asynchronous motors is repeated until the nth end value is attained for a number of rotating asynchronous motors of the selected group that is smaller than the preset value n.

5. A method according to claim 1, wherein the rotational frequency transmitted to the converter control is replaced by the measurement value identified from an additionally provided asynchronous motor, when all of the asynchronous motors of the selected group are still.

6. A method according to claim 2, wherein the rotational frequency transmitted to the converter control is replaced by the measurement value identified from an additionally provided asynchronous motor, when all of the asynchronous motors of the selected group are still.

7. A method according to claim 3, wherein the rotational frequency transmitted to the converter control is replaced by the measurement value identified from an additionally provided asynchronous motor, when all of the asynchronous motors of the selected group are still.

8. A method according to claim 1, wherein
(a) each asynchronous motor of the selected group is connected with a digital frequency indicator,
(b) digital frequency indicators $i_1-i_6$ connected respectively to a first pulse counter (1 through 6) that can be reset to the value 0, all of which give a pulse when a counter condition is reached at one output that is the same for all of the pulse counters (1 through 6),
(c) the outputs of the pulse counters (1 through 6) are connected with each other by an OR circuit (13–17),
(d) a second pulse counter (18) is connected to the output of the OR circuit (13–17) and releases an output pulse when a predetermined counter condition is reached with one of the frequency indicators, and
(e) the output of the second pulse counter (18) is transmitted to the reset inputs of the second pulse counter (18) and all first pulse counters (1 through 6) and to one input of each AND gate (25–30), the other input of which is connected with one of said frequency indicators.

9. A method according to claim 8, wherein
(a) the respective pulse abbreviating circuits (7 through 12) are provided between each first pulse counter (1 through 6) and the OR circuit (13 through 17) connected behind it,
(b) a time member (19 through 24) having two inputs is connected to the input of each AND gate (25 through 30) which is connected with the second pulse counter (18), and
(c) one of the two inputs of said time members (19 through 24) is connected with the output of the second pulse counter (18) and the other is connected with the output of the associated first pulse counter (1 through 6).

10. A method according to claim 8, wherein the outputs of the AND gates (25 through 30) are each connected with an input of a NOR circuit (31).

11. A method according to claim 9, wherein the outputs of the AND gates (25 through 30) are each connected with an input of a NOR circuit (31).

* * * * *